United States Patent
Wen et al.

(10) Patent No.: US 8,330,693 B2
(45) Date of Patent: Dec. 11, 2012

(54) TWO-STAGE DRIVE WAVEFORM FOR SWITCHING A DUAL FREQUENCY LIQUID CRYSTAL (DFLC) AT LARGE TILT ANGLES

(75) Inventors: Bing Wen, Thousand Oaks, CA (US); Dong-Feng Gu, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 831 days.

(21) Appl. No.: 12/497,025

(22) Filed: Jul. 2, 2009

(65) Prior Publication Data

US 2011/0001896 A1 Jan. 6, 2011

(51) Int. Cl.
  *G09G 3/36* (2006.01)
  *G02F 1/133* (2006.01)
(52) U.S. Cl. ............... 345/94; 345/87; 345/95; 349/33; 349/34; 349/36
(58) Field of Classification Search .................. None
  See application file for complete search history.

(56) References Cited

U.S. PATENT DOCUMENTS

| 4,688,899 | A | | 8/1987 | Fujimura |
| 4,836,654 | A | | 6/1989 | Fujimura |
| 4,946,260 | A | | 8/1990 | Fujumura |
| 5,214,523 | A | * | 5/1993 | Nito et al. ................... 349/173 |
| 5,261,552 | A | | 11/1993 | L'Hotel |
| 5,877,826 | A | | 3/1999 | Yang |
| 6,014,124 | A | | 1/2000 | Dickinson |
| 6,456,419 | B1 | | 9/2002 | Winker |
| 6,832,028 | B2 | * | 12/2004 | Gu et al. ........................ 385/41 |
| 7,260,286 | B2 | * | 8/2007 | Gu et al. ........................ 385/20 |
| 7,268,849 | B2 | | 9/2007 | Gu |
| 2004/0150598 | A1 | * | 8/2004 | Golovin et al. ................. 345/87 |
| 2005/0253111 | A1 | | 11/2005 | Raja |
| 2007/0139595 | A1 | | 6/2007 | Kwok |

OTHER PUBLICATIONS

Andrew K. Kirby and Gordon D. Love "Fast, large and controllable phase modulation using dual frequency liquid crystals" Optics Express, vol. 12, No. 7, pp. 1470-1475 Apr. 5, 2004.
David Dayton et al. "Characterization and control of a multielement dual-frequency liquid-crystal device for high-speed adaptive optical wave-front correction" Applied Optics, vol. 40, No. 15, pp. 2345-2355 May 20, 2001.
Dong-Feng Gu et al. "Dual Frequency Liquid Crystal Devices for Infrared Electro-Optical Applications" SPIE Proc. vol. 4799, p. 37-47, 2002.

(Continued)

*Primary Examiner* — Bipin Shalwala
*Assistant Examiner* — Ryan A Lubit
(74) *Attorney, Agent, or Firm* — Eric A. Gifford (57) ABSTRACT

A two-stage drive waveform switches a DFLC from a high tilt state to a low tilt state quickly and without scattering. A relaxation voltage is applied to delay the onset of the high amplitude high frequency kick voltage when switching from a high tilt state to a low tilt state. The relaxation voltage allows the molecules to 'relax' in accordance with their own elasticity towards their low tilt state in the direction of the average azimuth angle of the low tilt state. The kick voltage is then applied to drive the molecules quickly to the low tilt state. Optimal switching time and the desired molecular response is achieved by delaying the onset of the large kick voltage via application of the relaxation voltage. The relaxation voltage may constitute a lower amplitude holding voltage, a small or zero DC voltage or a smooth windowing of the kick voltage.

22 Claims, 10 Drawing Sheets

OTHER PUBLICATIONS

Dong-Feng Gu et al "Calibration of a spatial light modulator containing dual frequency liquid crystal" SPIE Annual Meeting, San Diego, Aug. 18, 2005.

Y. Yin et al. "Thermodielectric bistability in dual frequency nematic liquid crystal" Physical Review Letters 98, 097801 Mar. 2, 2007.

A.B. Golovin et al "Fast switching dual-frequency liquid crystal optical retarder, driven by an amplitude and frequency modulated voltage" Applied Physics Letters, vol. 83, No. 19, Nov. 10, 2003.

Oleg Pishnyak et al. "Electrooptical applications of dual-frequency nematics: From tunable lenses to microfluidic devices" SID 26th Int Display Research Conference 2006.

* cited by examiner

TWO-STAGE DRIVE WAVEFORM FOR SWITCHING A DUAL FREQUENCY LIQUID CRYSTAL (DFLC) AT LARGE TILT ANGLES

BACKGROUND OF THE INVENTION

1. Field of the Invention

This invention relates to liquid crystal devices and more specifically to drive waveforms for switching dual-frequency liquid crystal (DLFC) devices at large tilt angles.

2. Description of the Related Art

Liquid crystal devices have many different electro-optical applications including tunable waveplates, spatial light modulators, displays, color filters, gratings, beam steering devices, optical switches, etc. . . . Application of a voltage across a liquid crystal cell modifies the polar angle or 'tilt' of the liquid crystal molecules on average, which in turn changes the birefringence of the cell. The birefringence can be used to change the polarization and/or phase of an incident polarized light beam without affecting beam intensity. Modulation of the liquid crystal devices can be either binary (on/off) or gray-scale (continuous or discrete) and can be done pixel-by-pixel, for groups of pixels or for the entire LC device.

Figure 1:
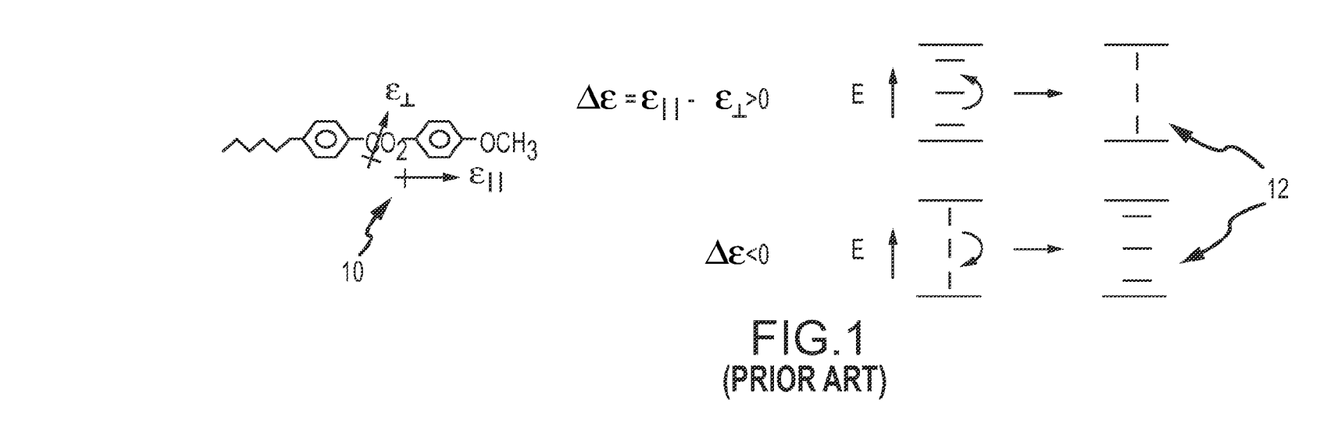
FIG. 1, as described above, illustrates the dielectric anisotropy of liquid crystal materials and their response.

In liquid crystals the electro-optic effect results from the anisotropic nature of their molecular structure 10. The physical properties along the LC director 12 (average molecular axis) differ from those that are perpendicular to the director. In particular, the dielectric anisotropy $\Delta\epsilon = \epsilon_\parallel - \epsilon_\perp$ allows the director to be oriented either parallel ($\Delta\epsilon > 0$) or perpendicular ($\Delta\epsilon < 0$) to the applied electric field as shown in FIG. 1. The refractive index of LCs is also anisotropic. Thus the rotation of the LC director under the influence of an electric field changes the effective refractive index of the LC medium which alters the polarization state of the light passing through.

As simple yet important components in optical systems, liquid crystal tunable waveplates (LCTW) are used to adjust the phase delay of one of the polarization components of an optical beam, resulting in desired changes in the polarization status of the beam. An example is given in FIG. 2, where a linearly polarized incident beam 20 having a linear polarization 22 is passed through a LCTW 24 with its optical axis 26 aligned at an azimuth angle of 45° (direction of phase retardation) with respect to the incoming polarization to output a beam 28 with a 90° polarization rotation 30. The rotation happens only if the LCTW is turned to be half wave plate for the given wavelength. A 0° polarization rotation happens only if the LCTW is tuned to be full wave plate for the given wavelength. The tilt of the liquid crystals is controlled to produce the necessary change in average effective birefringence $\Delta n_{eff}$ for the half and full wave plates, respectively. And the induced retardation in the wave plates is $d\Delta n_{eff}$, where d is the LC cell thickness. This 'core' LCTW can be used in many different applications depending on, for example, input components to polarize the input beam, modulation of the LCTW and output components to readout the polarization or phase delay written onto the carrier beam. These configurations and techniques are well known in the art.

Figure 2:
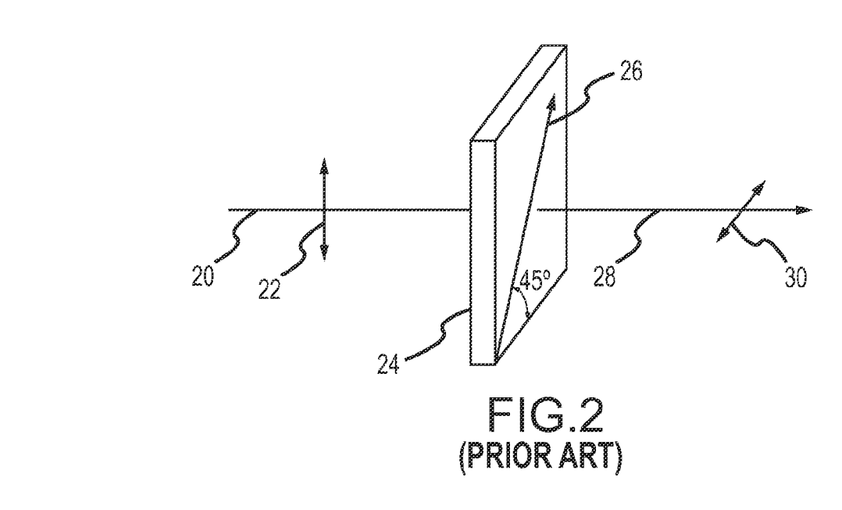
FIG. 2, as described above, is a diagram of a liquid crystal waveplate.

In liquid crystals the induced change in the average effective birefringence or retardation is approximately linearly proportional to the applied holding voltage from roughly 10-45 degrees of tilt. To achieve tilt angles greater than about 45 degrees, the voltage becomes highly nonlinear and much larger, and the maximum tilt is about 85 degrees. The average effective birefringence is also a function of cell thickness, the thicker the cell the more birefringence changes for a given tilt. For current narrowband applications, the cell thickness is selected so that a range of tilt angles in the LC's linear range produces a desired range of birefringence. For example, LCTW 26 can be configured so that it can switch between a low tilt angle in the linear region that produces an effective birefringence for a half wave plate that rotates the polarization by 90° at the given wavelength and a high tilt angle in the linear region that produces an effective birefringence for a full wave plate that does not affect the polarization of the light at the given wavelength.

In most applications, it is desirable to switch the liquid crystal cells from the low field state to the high field state and vice-versa as fast as possible. The average tilt of LC molecules within a cell is set by the amplitude of the voltage across the cell, the larger the voltage the greater the tilt. In theory the DC voltage across the cell can be changed to modify the tilt to achieve a desired effective birefringence. For reasons having to do with lifetime issues, a low frequency AC voltage is applied with the peak-to-peak voltage determining the tilt. When switching low to high, the AC voltage is increased and the molecules respond to the electric field by pushing towards the higher tilt state against their 'elasticity'. The steady-state 'tilt' is where the electric field push balances the elastic pull. It is well known that the switching speed can be increased by first applying a larger 'kick' AC voltage to switch the molecules and then reducing the voltage to a steady-state hold value. When switching high to low, application of a much smaller 'kick' voltage unfortunately does not cause the molecules to respond to the electric field by being pulled down to their low tilt state. Application of a smaller amplitude voltage merely reduces the push. Consequently, 0 V is suitably applied to the LC to remove the electric field, hence 'push' thereby allowing the molecules to relax back to a desired tilt set by a lower steady-stage hold value. Relaxation is a slow process, the 0 V signal may be applied for as long 10 ms before the low tilt state is reached and the holding voltage can be applied. As a result, liquid crystals in the visible and near-IR bands switch low-to-high in less than 1 ms typically but switch high-to-low in typically about 10 ms, which is not desirable.

Figure 3A:
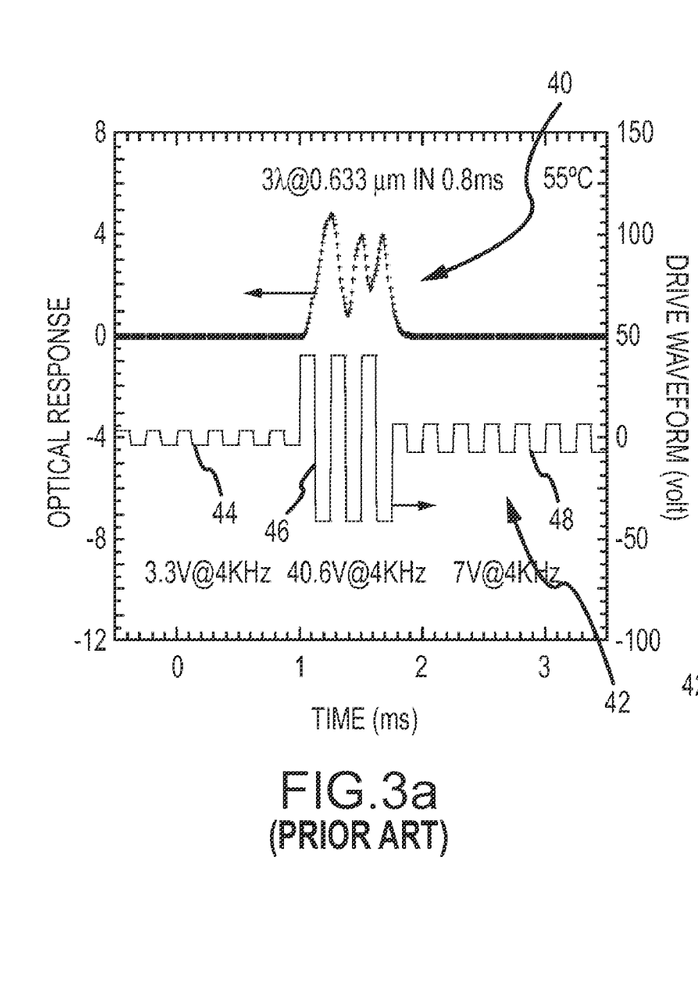
FIGS. 3a and 3b, as described above, illustrate the dual-frequency drive waveforms for switching between low and high field states.
Figure 3B:
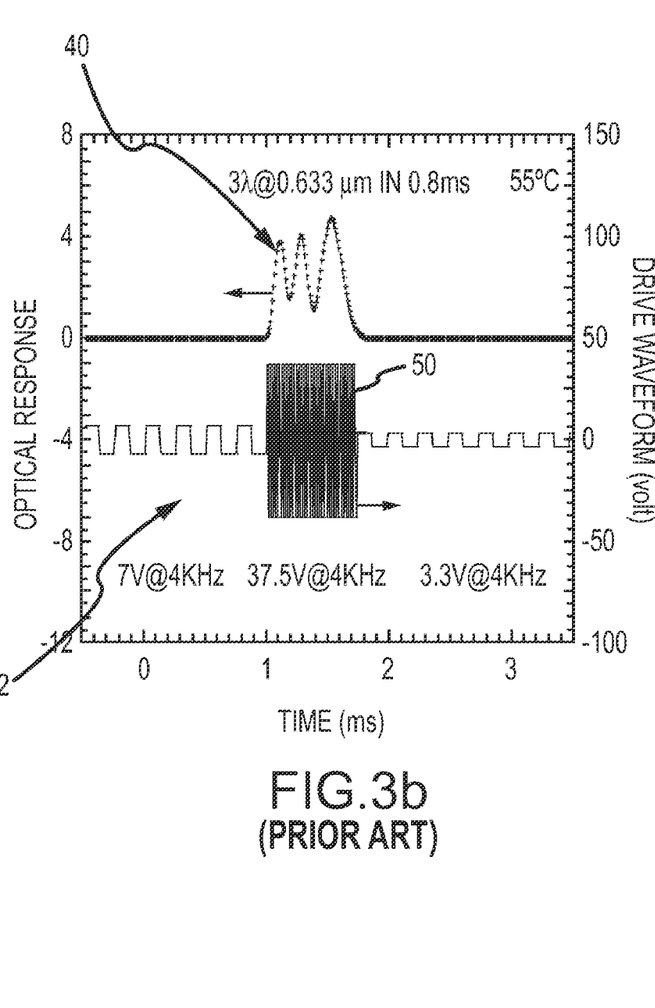
Figure 4:
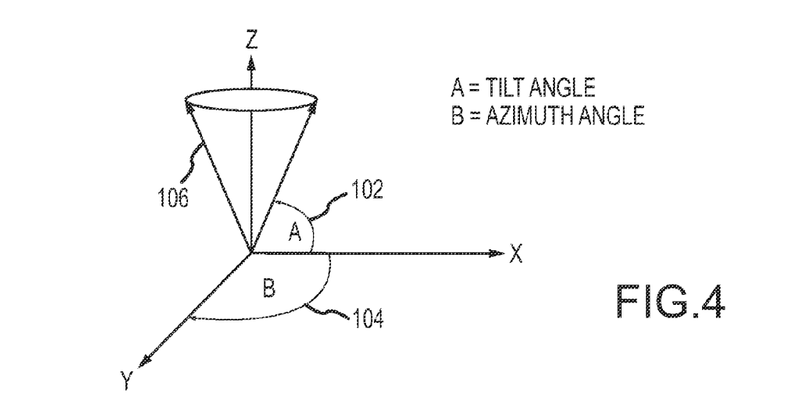
FIG. 4 is a diagram illustrating the tilt and azimuth angles of the liquid crystal molecules.

In the early 1980s it was discovered that for certain 'dual-frequency' liquid crystal materials if the frequency of the drive waveform were increased beyond a crossover frequency the molecules would exhibit an inversion of the sign of the dielectric anisotropy and thus would react to the same electric field when switching high-to-low by being pulled back to zero. Thus the molecules could be actively driven in both directions by changing the frequency of the high-amplitude kick waveform thereby reducing the switching times to about 1 ms in both directions. A typical electro-optical response 40 of a DFLCTW switching between $\lambda$ and $4\lambda$ ($\lambda = 632$ nm) and the dual-frequency drive waveform 42 for switching low-to-high and high-to-low is illustrated in FIGS. 3*a* and 3*b*. Here $\lambda$ represents a retardation that is equivalent to a full wave of $\lambda$. At 90 degree tilt, the retardation is 0. At some lower tilt angle, the retardation is $\lambda$ and at an even lower tilt angle the retardation is $4\lambda$. In this example, the crossover frequency is approximately 25 KHz. As shown in FIG. 3*a*, the drive waveform includes a low amplitude low frequency holding voltage 44 of 3.3V@4 Khz to hold the LC in a low tilt state. To switch the LC to a high tilt state, the drive waveform is switched to a high amplitude low frequency kick voltage 46 of 40.6V@4 KHz that pushes the molecules against their elastic forces to a higher tilt state. Once switched, the voltage is reduced to a high amplitude low frequency holding voltage 48 of 7V@4 KHz where the 'push' and 'pull' forces are in equilibrium. As shown in FIG. 3*b*, to switch high-to-low, a high amplitude high frequency kick voltage 50 of 37.5V@50 KHz is applied creating a large electric field that 'pulls' the liquid crystal molecules back to the low state. The LC can switch in either direction in about 1 ms.

Andrew Kirby and Gordon Love in their paper entitled "Fast, large and controllable phase modulation using dual frequency liquid crystals" 5 Apr. 2004 Vol. 12, No. 7 OPTICS EXPRESS pp. 1470-1475, noted that dual frequency control has not widely been used due mainly to the complexity of the control method. The enumerated three complications: "There is not a simple relationship between the starting phase, the next desired phase and the required voltage sequence", "The LC must not be used near to saturation, otherwise the plane of the director can become undefined and scattering occurs", and "High frequency high amplitude voltages must be applied with care, otherwise damage due to heating in the LC cell can occur" thus reaffirming the accepted practice of configuring dual frequency liquid crystals to operate in the linear region. Kirby and Love reported on a method for high speed, large stroke phase modulation using dual frequency control of liquid crystals.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a DFLC and method of applying a drive waveform to switch from a high tilt state such as above the LC's linear region and possibly near the 'saturated' or 'field-driven homeotropic' state of the LC to a low tilt state quickly and without scattering. This approach facilitates operation of DFLCs outside their linear region and provides an alternative to scaling cell thickness for many applications.

This is accomplished by applying a relaxation voltage prior to the application of the high amplitude high frequency kick voltage when switching from a high tilt state to a low tilt state. Most unexpectedly, optimal switching time and the desired molecular response is achieved by delaying the onset of the high amplitude high frequency kick voltage via application of the relaxation voltage. The relaxation voltage has the effect of allowing the molecules' elastic forces to be dominant for a brief relaxation period. This condition allows the molecules to 'relax' in accordance with their own elasticity towards their low tilt state in the direction of the average azimuth angle of the low tilt state. Once the tilt angle has relaxed sufficiently, the kick voltage is applied to drive the molecules quickly to the low tilt state. The relaxation voltage may constitute 0 V that completely removes the electric field, a lower amplitude holding voltage that reduces the push on the molecules, or a windowing of the high-frequency kick voltage that reduces the pull on the molecules. Whether to apply the relaxation voltage at all and how to apply the relaxation voltage for optimal switching are suitably controlled as a function of the high tilt state. If the high tilt state does not exceed a threshold, the controller may forego the relaxation voltage and apply the kick voltage without delay. If the high tilt state is near saturation, the controller may apply the relaxation for a longer period of time to allow the molecules to relax. The DFLC is suitably switched from the low-to-high tilt state in the conventional manner without application of a relaxation voltage.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a DFLC and method of applying a two-stage drive waveform to quickly switch from a high tilt state such as above the LC's linear region or near the 'saturated' or 'field-driven homeotropic' state of the LC to a low tilt state. This approach facilitates operation of DFLCs outside their linear region and provides an alternative to scaling cell thickness for many applications.

As described above scaling the thickness of the cell allows the DFLC to be operated in its linear region of approximately 10 to 45 degrees of tilt. This approach is widely used and adequate for stable narrowband light. However, with broadband (e.g. the RGB spectrum from 400-700 nm) or wavelength shifting light (actual or effective due to angle of incidence) the conventional approach of scaling device thickness to achieve a broader range of birefringence capability is not effective. For example, to construct a switchable broad band polarization rotator like the LCTW 26 shown in FIG. 2, it is necessary to switch the LC to large tilt angles outside the linear region and near saturation. More specifically, a 0° tilt will rotate the polarization of all wavelengths by 90° and a 90° tilt will produce zero effective birefringence allowing all wavelengths to pass unaffected. Since the maximum tilt is less than 90° a compensator film is used to negate any residual birefringence. This is only one example in which it is necessary to switch the LC to high tilt angles outside the linear region and possibly near saturation (90°). In other applications, switching to high tilt angles may be preferable to scaling the thickness of the LC cell. This is true for single and narrowband applications that currently employ thickness scaling.

What we observed is that when the high-amplitude high-frequency kick voltage 50 shown in FIG. 3b was applied to the LC to switch high-to-low when transitioning from a high state near saturation, instead of switching back to the low tilt state in the direction of the original azimuth angle the molecules became randomly aligned in all directions with respect to the original azimuth angle. After several seconds the molecules would realign themselves to the original azimuth angle. When confined to operate with the LC's linear region this random alignment of the molecules when switching high-to-low is not observed.

Figure 5A:
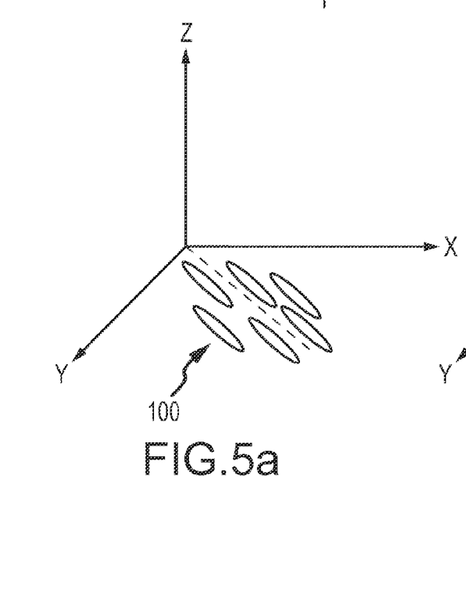
FIGS. 5a through 5c are molecular flow diagrams illustrating an initial low field state, a switched high field state at a large tilt angle near saturation, and the switched low field state in which the azimuth angle has been randomized.
Figure 5B:
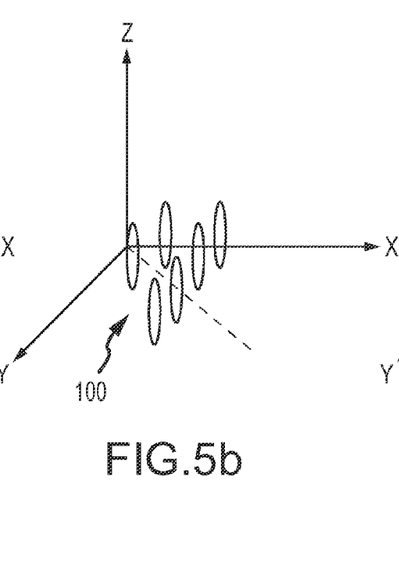
Figure 5C:
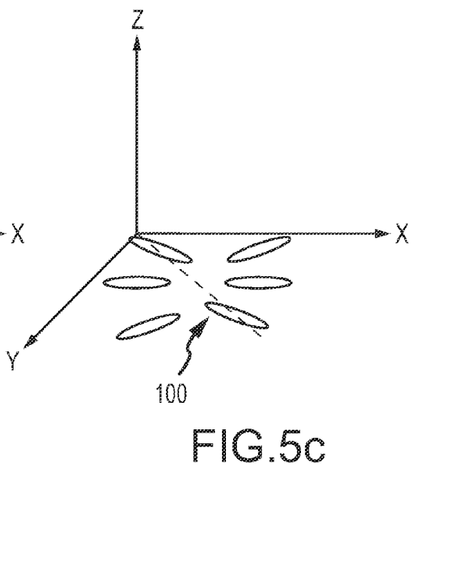

In an attempt to understand and characterize the problem reference is made to FIGS. 4 and 5a through 5c. In this example, molecules 100 switch from an initial low tilt state of 0 degrees to a high tilt state of 90 degrees. The tilt or polar angle 'a' 102 of the molecules is defined as the angle from the XY plane towards the Z-axis and the azimuth angle 'b' 104 is defined in the XY plane. In the low state, molecules 100 lie in the XY plane having an average azimuth angle of, for example, 45 degrees. For simplicity all molecules are shown as having the average angle. As the average tilt angle of the molecules increases two different observations are made. First, some percentage of the molecules will tilt beyond 90 degrees. This percentage becomes larger the closer the tilt becomes to the saturated state. Second, as the tilt angle increases, the azimuth angle, as illustrated by cone 106, becomes less significant, and at 90 degrees it becomes indeterminate. Therefore in a high tilt state such as above the LC's linear region or near saturation a significant percentage of the individual molecules tilt past 90 degrees and the original azimuth angle is insignificant. At steady-state, the pushing force generated by the electric field from the holding voltage balances the molecular elastic forces that want to pull the molecules back to their initial low state. Our hypothesis is that when the kicking voltage 50 is applied the large pulling force tends to drive the molecules 100 to the low tilt state but in all directions relative to the original azimuth angle as shown in FIG. 5c. Although the elastic forces want to pull the molecules towards the original azimuth angle, the elastic pulling forces are much smaller than the pulling forces due to the electric field (at least an order of magnitude) and are simply overwhelmed. The randomizing of the azimuth orientations fails to switch the LC as desired.

Figure 6A:
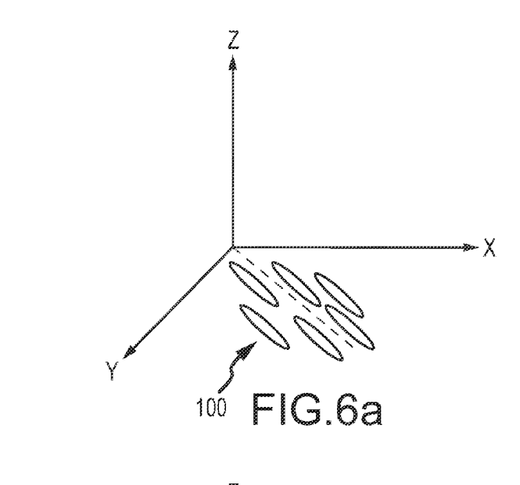
FIGS. 6a through 6d are molecular flow diagrams illustrating an initial low field state, a switched high field state at a large tilt angle near saturation, a relaxed state in which the tilt angle has been reduced along the initial azimuth angle and the switched low field state in which the molecules return to the initial azimuth angle.
Figure 6B:
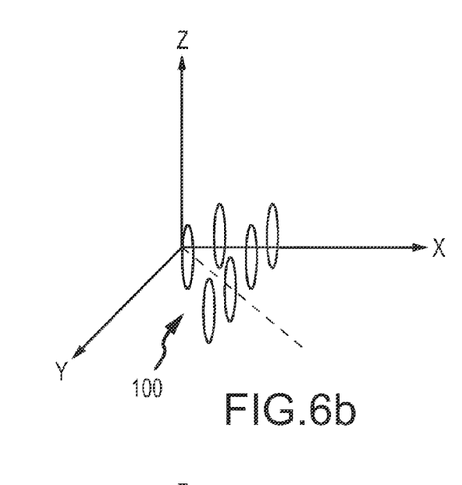
Figure 6C:
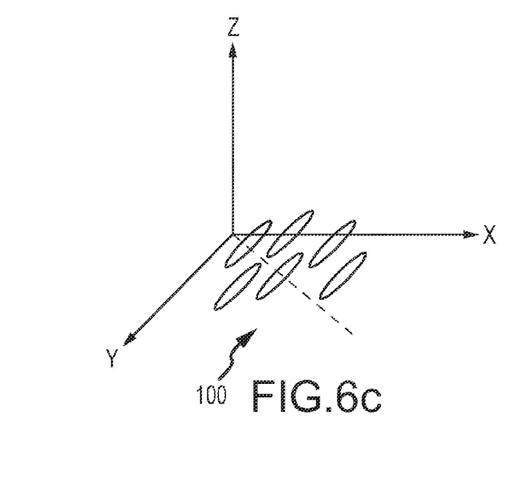
Figure 6D:
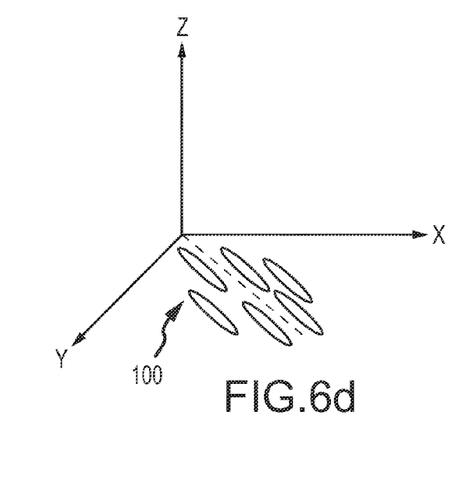

An effective solution to the problem of switching from a high tilt state near saturation to a low tilt state must return the molecules 100 to the original tilt and azimuth angles (on average) and must do so without sacrificing switching speed appreciably. Our solution is to apply a 'relaxation' voltage that allows the molecules to relax for a short period of time before applying the high-amplitude high-frequency kick voltage as illustrated in FIGS. 6a through 6d. During this brief relaxation period, the forces due to the electric field are either removed entirely or at least greatly diminished such that the molecules' elastic forces dominate and tend to pull the molecules albeit slowly toward the low tilt state in the direction of the original azimuth angle as shown in FIG. 6c. This approach both reduces the percentage of molecules whose tilt is greater than 90 degrees and increases the significance of the original azimuth angle at the end of the relaxation period. As a result, when the kick voltage is applied to accelerate switching a vast majority of the molecules return to the original azimuth angle as shown in FIG. 6d. The duration of the relaxation period will depend upon many different factors including the thickness of the LC film, how near saturation the high tilt state is, e.g. 85, 65 or 55 degrees and the topology of the relaxation voltage. For example, LC cells that operate in the visible or near IR-bands will typically apply the relaxation voltage for 0.3 to 1 ms with a total switching period of no greater than 2 ms whereas mid-wave and long wave IR-bands will typically require application for approximately 1 to 4 ms with a total switching period of no greater than approximately 5 ms. In general, LCs designed for longer wavelength applications will be thicker, hence their elastic forces will be weaker requiring a longer relaxation period.

Figure 7:
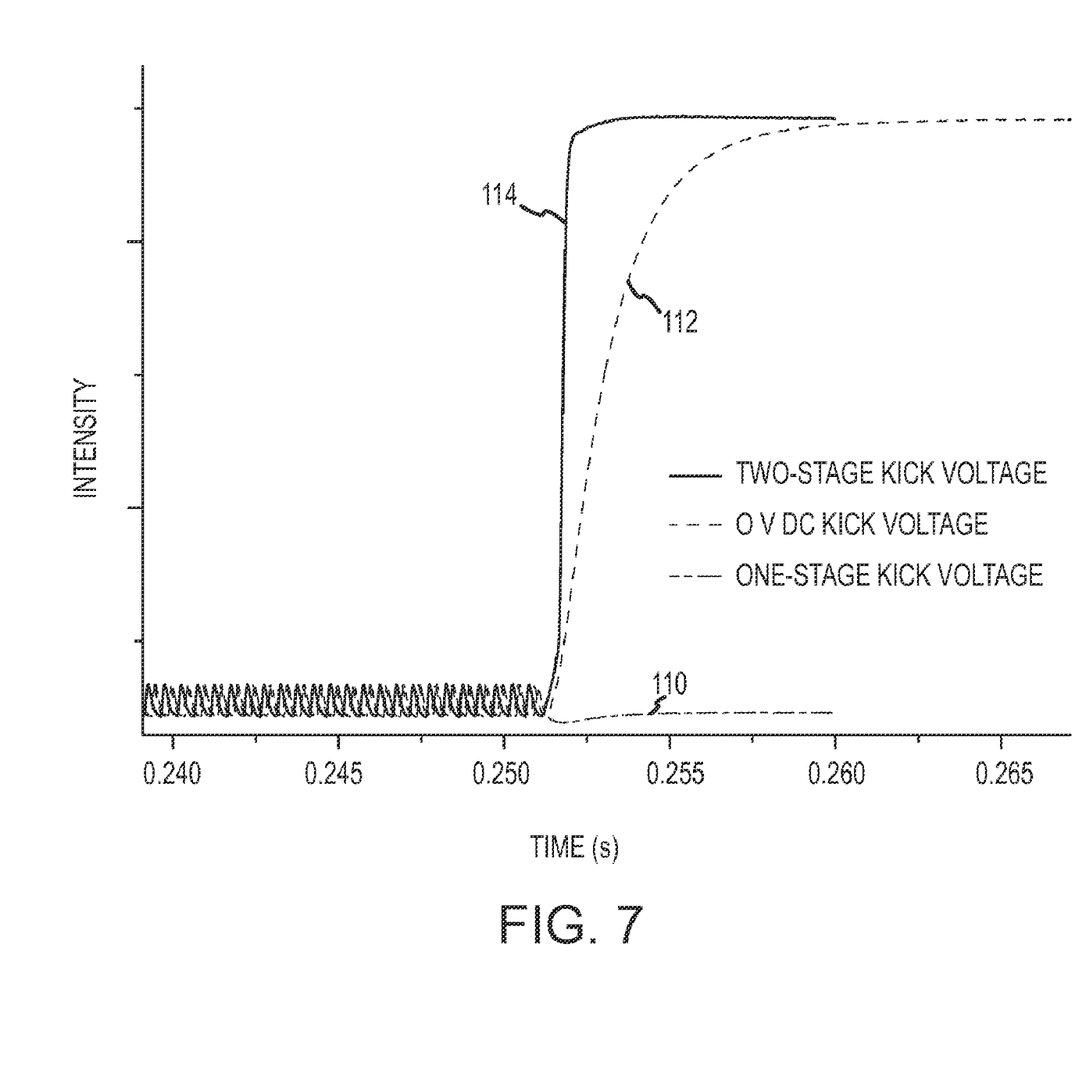
FIG. 7 is a plot of optical intensity passed through the waveplate versus time for a single-frequency drive waveform, a conventional dual-frequency drive waveform and a two-stage dual-frequency drive waveform in accordance with the present invention.

Generated from real experimental data, FIG. 7 compares plot 110, 112 and 114 of optical intensity versus time for a DFLC device configured to pass light in its low tilt state for a conventional kicking voltage that randomizes the alignment, 0 V kicking voltage (analogous to single-frequency switching) that allows the molecules to slowly relax to the low tilt state and a two-stage kicking voltage in accordance with the present invention, respectively. Plot 110 shows that the conventional kicking voltage switches the tilt angle very quickly but the randomization of the azimuth angle causes the light to be scattered and blocked, hence the LC does not 'switch' properly. Plot 112 shows that the elastic forces will allow the molecules to switch back to the initial state albeit very slowly, approximately 10 ms, if the electric field is removed. Plot 114 for the two-stage drive waveform shows that for approximately 0.3 ms the response tracks plot 112 as the molecules relax and then accelerates rapidly when the high-amplitude high-frequency kicking voltage is applied and switches completely in about 1 ms. Tests have shown the two-stage drive waveform to be highly effective in properly switching the molecules from the high state back to their low state orientations (both tilt and azimuth) without sacrificing switching speed. Most unexpectedly, optimal switching time and accuracy is achieved by delaying the onset of the large kick voltage via application of the relaxation voltage.

Figure 8A:
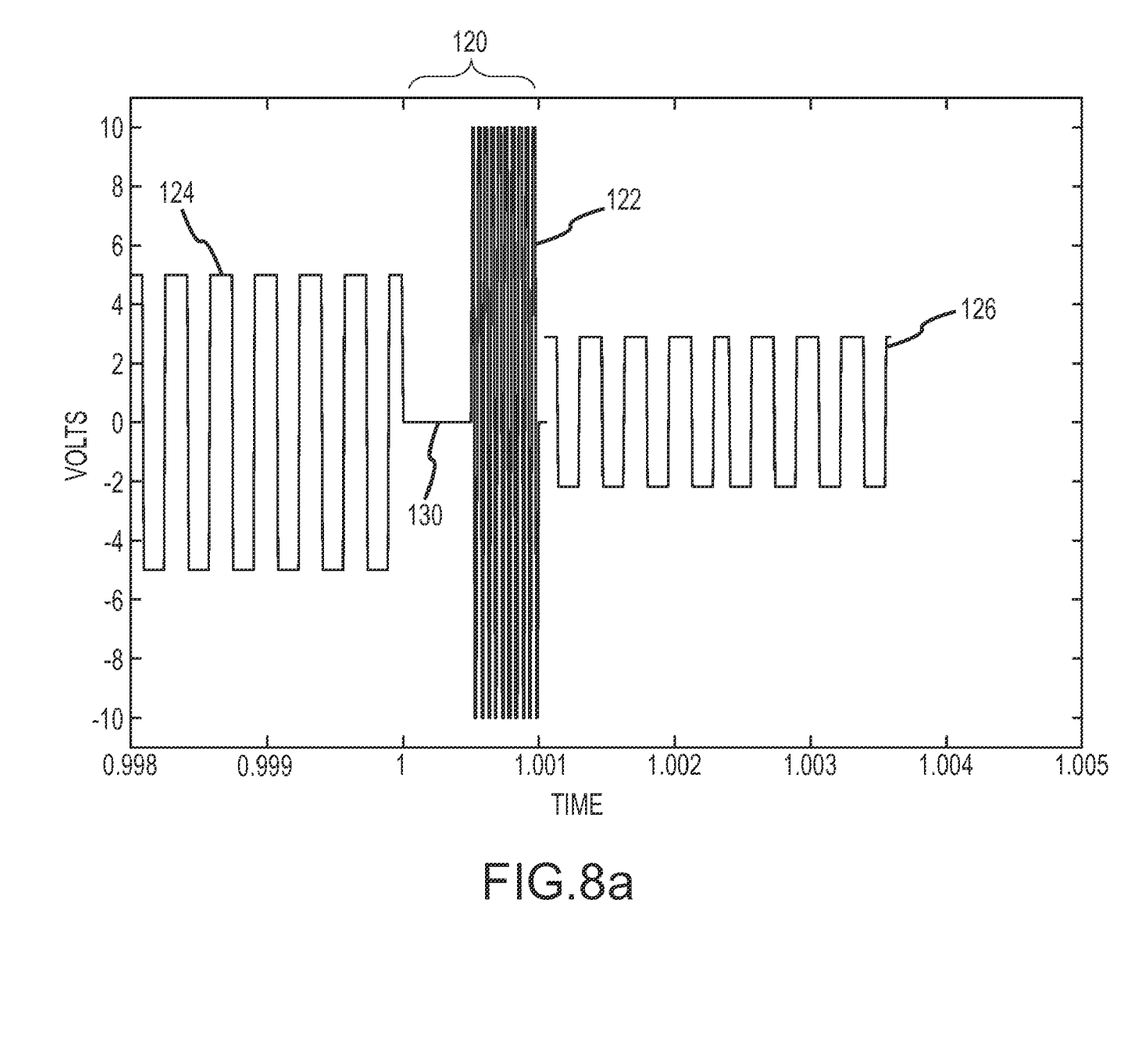
FIGS. 8a through 8c are diagrams of different embodiments of the two-stage dual-frequency drive waveform.
Figure 8B:
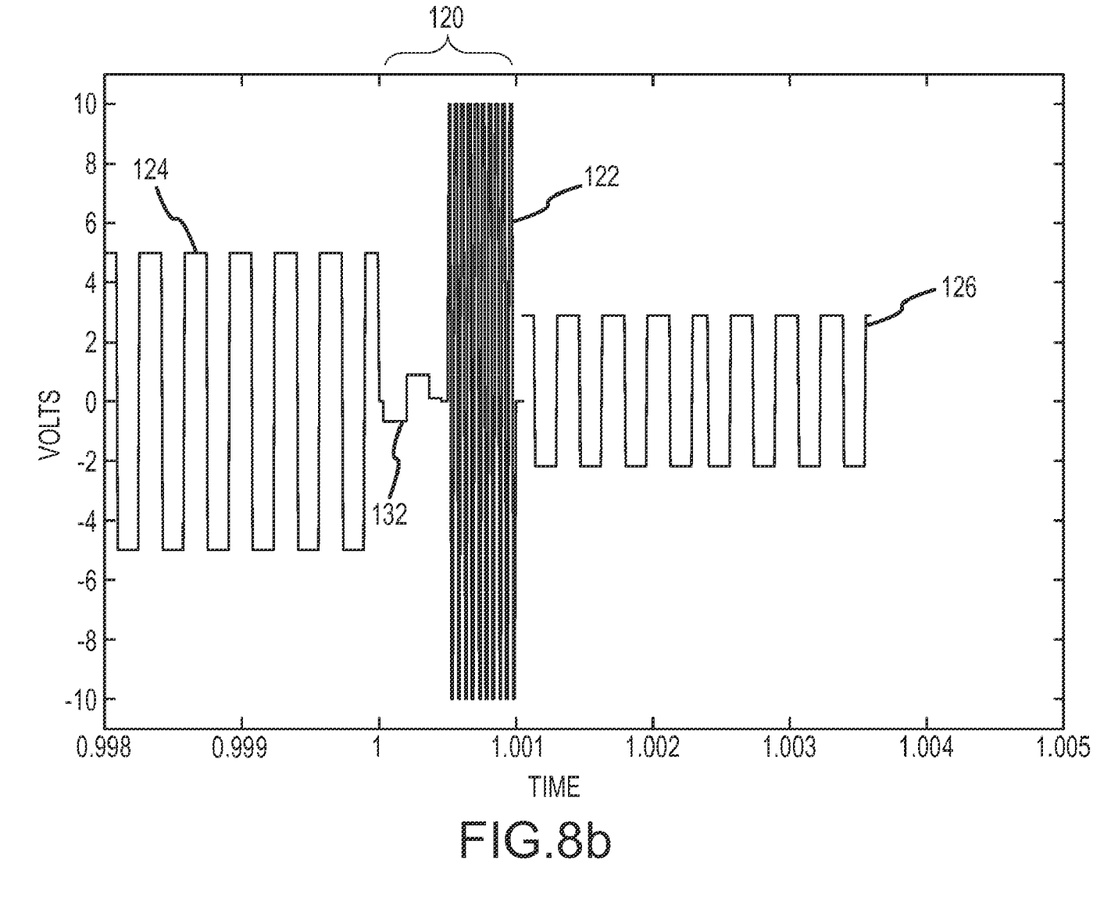
Figure 8C:
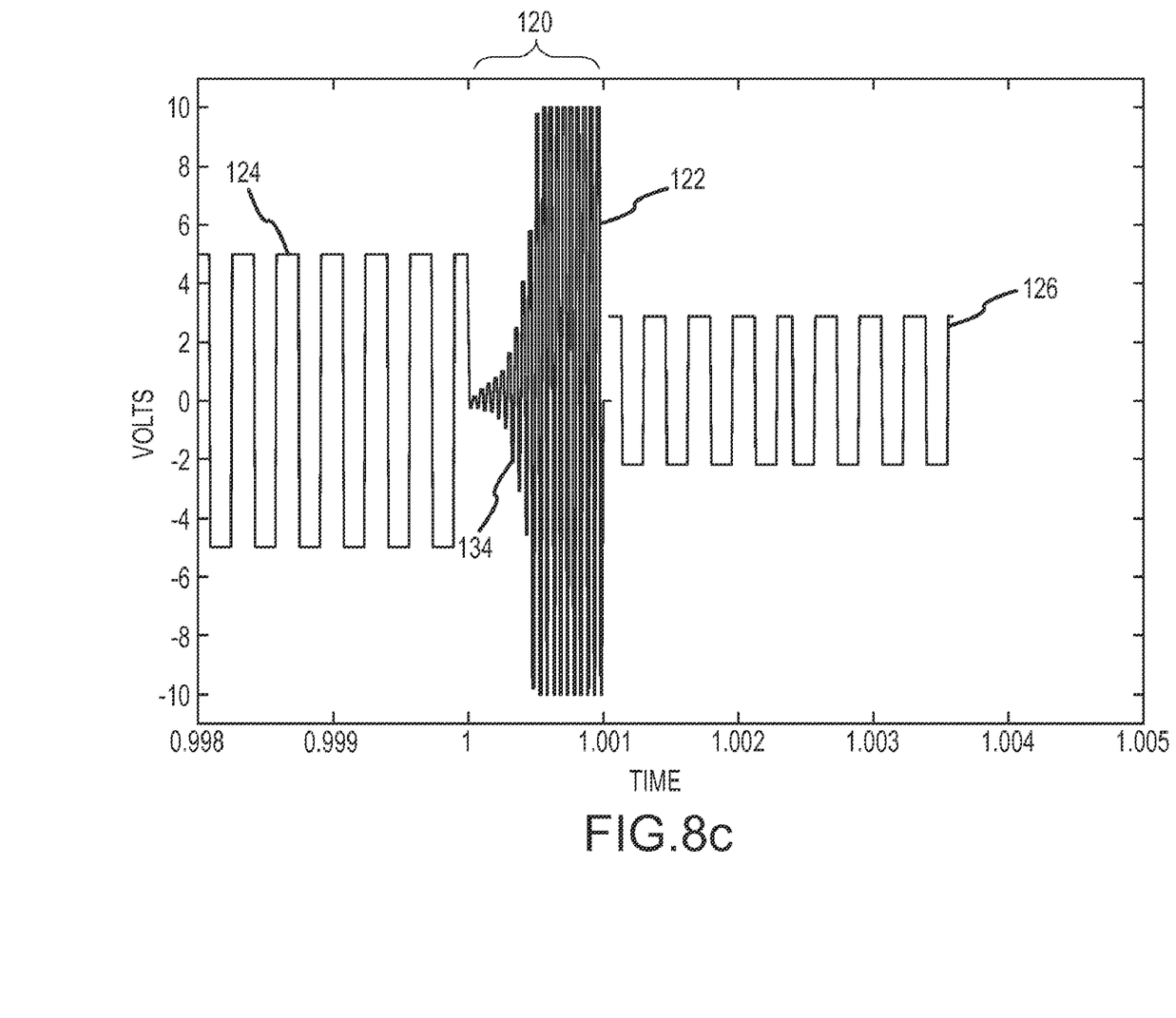

Application of the relaxation voltage temporarily removes the pulling and pushing forces on the molecules due to their interaction with the applied electric field. The pushing forces that hold the molecules in equilibrium in the high state must be removed to allow the molecules to switch. The large pulling forces that otherwise drive the molecules toward the low state are delayed for a brief period. A number of different relaxation voltage topologies as illustrated in FIGS. 8a through 8c may be employed. In each case, the amplitude of the high-frequency kicking voltage is preferably optimized to reduce the overall switching period. For context, the two-stage drive waveform 120 which includes a relaxation voltage and a high-amplitude, high-frequency kick voltage 122 (37.5V@50 KHz) is depicted with the high state holding voltage 124 (7V@4 KHz) and the low state holding voltage 126 (3.3V@4 KHz).

In a first embodiment shown in FIG. 8a, a relaxation voltage of 0 V DC 130 is applied. 0 V removes the electric field entirely so that there is no external pushing or pulling forces on the molecules. In a second embodiment shown in FIG. 8b, a relaxation voltage 132 of 4.5V@4 KHz is applied. Since the amplitude of relaxation voltage 132 is less than the amplitude of holding voltage 124, the 'push' on the molecules is reduced and they will relax until equilibrium is reestablished. Relaxation will be a bit slower because there is still some amount of force pushing on the molecules. Another approach is to apply a voltage having a frequency above the cross-over having very small amplitude. This will produce pulling forces on the molecules but forces that are dominated (at least an order of magnitude smaller than) by the elastic forces for a sufficient period to allow the molecules to relax. In this case, relaxation will be a bit faster but care must be taken to ensure that the orientation of the molecules is preserved In an embodiment of this approach shown in FIG. 8c, the high-frequency kick voltage 122 has been scaled by a window function such as an exponential function that reduces the amplitude to near zero at switching and smoothly increases the voltage with time until the function reaches unity. Other types of window functions such as logarithmic or linear may be applied. The windowed portion of the kick voltage is considered to be the relaxation voltage 134.

Figure 9:
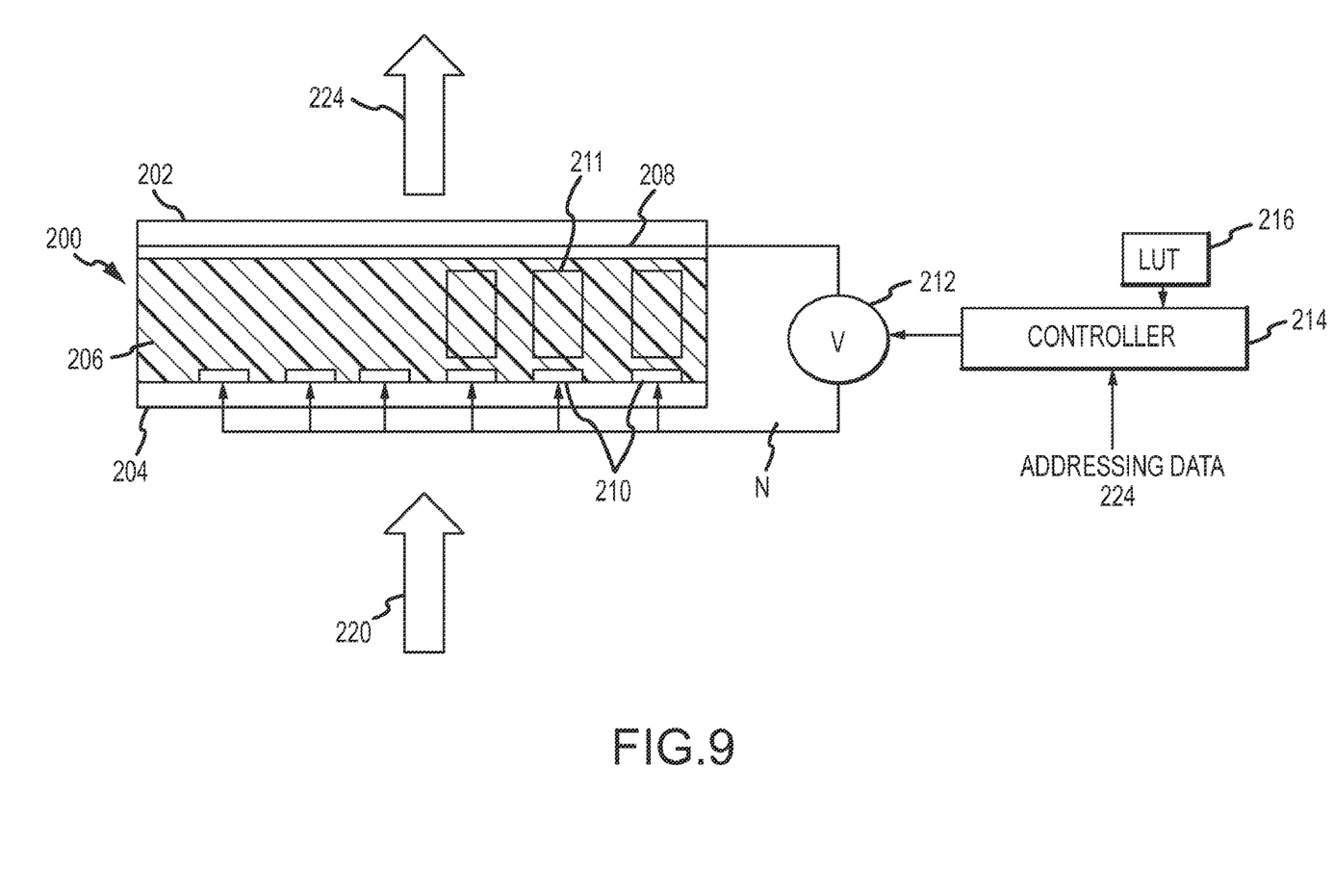
FIG. 9 is a block diagram of a DFLC and drive waveform controller.

As depicted in FIG. 9, a dual-frequency liquid crystal cell 200 comprises a pair of opposed substrates 202 and 204 having a cell gap there between. The substrates are substantially transparent in the band of interest e.g. visible, near IR, IR or far IR regions. A dual frequency nematic liquid crystal material 206 is disposed in the cell gap and characterized by a cross-over frequency. At least one electrode 208 and 210 is coupled to each of the substrates. In this example, the top electrode 208 is a single continuous electrode and the bottom electrode 210 is an addressable array of pixilated electrodes. The liquid crystal material between each bottom electrode 210 and continuous top electrode 208 defines a cell 211. The electrodes are suitably transparent as well. A power supply 212 is connected to the electrodes to apply different voltage magnitudes at different frequencies above and below the cross-over frequency. A controller 214 is configured to control the power supply for (a) applying a first holding voltage of a first magnitude to the material at a frequency below the cross-over to maintain the high tilt state, (b) applying a relaxation voltage to the material to allow the liquid crystal molecules to relax towards the low tilt state for a relaxation period, (c) applying a kicking voltage of a second magnitude greater than the first magnitude to the material at a frequency above the cross-over to accelerate a transition into the low tilt state, and (d) applying a second holding voltage of a third magnitude less than the first magnitude to the material at a frequency below the cross-over to maintain the low tilt state. A look-up table (LUT) 216 may be used to store the relaxation waveform, relaxation period, kick waveform and kick period as functions of the high tilt state (in addition to the holding voltages). These values can be precalculated and stored in the LUT. Alternately, the controller may be configured to compute the values on the fly.

An optical beam 220 in some desired band is input to the DFLC 200. The desired band could be broadband light (RGB spectrum), narrowband light that changes wavelength, stable narrowband light or a single wavelength. The benefits of this invention were derived for broadband and changing wavelength sources but are applicable to narrowband applications as well in which switching at large tilt angles is preferable to scaling the cell. Addressing data 222 is provided to the controller to tell the controller how much tilt to place on each cell. Depending on the application each cell may be addressed independently or the entire DFLC addressed as one unit. The cells may be addressed synchronously at, for example, a standard video frame rate of 60 Hz or may be addressed asynchronously. The cells may be switched between binary low and high states or along a continuous or discrete gray scale. It is important to note that the two-stage drive waveform is only used for switching from a relatively high to a relatively low state and whether you apply the 'relaxation' voltage is only dependent on the relatively high state. DFLC 200 modulates optical beam 220 to encode addressing data 222 therein and output optical beam 224. Each pixel of optical beam 224 has had its phase delayed or polarization changed in accordance with the addressing data.

Figure 10:
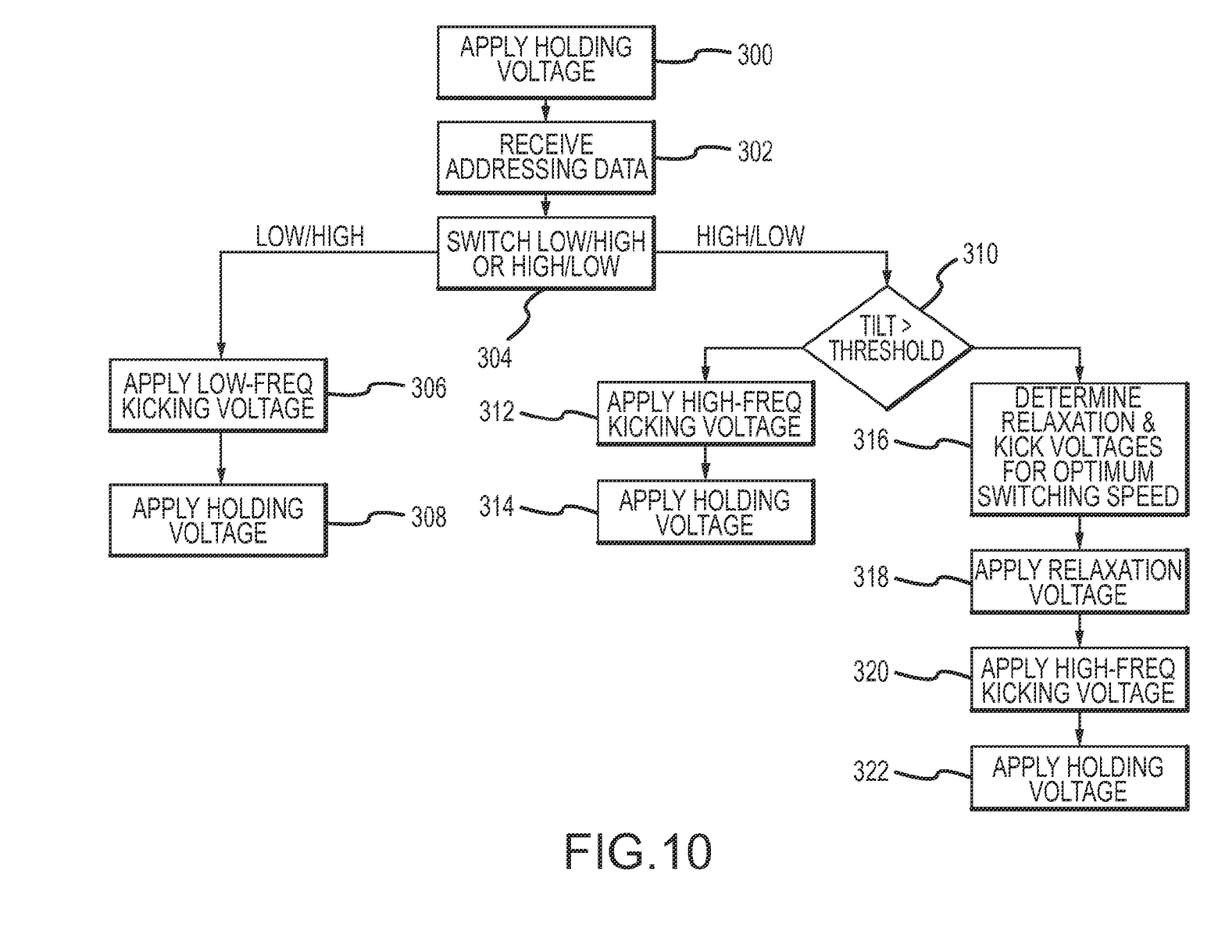
FIG. 10 is a flowchart for applying the two-stage drive waveform to the DFLC.

An exemplary flow diagram of the steps performed by the controller for a single cell and single switching cycle is illustrated in FIG. 10. The controller applies a holding voltage to hold the tilt angle at a previously specified value (step 300). Once new address data is received, synchronously or asynchronously, (step 302), the controller determines whether the new data represents a transition from low-to-high or high-to-low with respect to the current tilt angle (step 304). If the data represents a low-to-high transition, the controller controls the power supply to immediately apply a high-amplitude low-frequency kick voltage (step 306) to switch the cell and then apply a low-frequency holding voltage (step 308). If the data represents a high-to-low transition, the controller suitably determines whether the current high tilt state exceeds a threshold (step 310). The threshold value can be determined by a number of different factors including the liquid crystal material and thickness, operating temperature and application performance requirements but in general represents the point at which applying the high-frequency kick voltage immediately causes unacceptable randomization of the molecules. Typically, the threshold will be determined empirically by testing a particular LC for a specified application. The threshold is used in application with gray scale modulation. In binary applications the high state will be either known to be of a sufficiently high tilt to require the two-stage drive waveform or not. The threshold could be set to zero such that every high-to-low state transition was switched using a two-stage drive waveform. This might be done for simplicity, e.g. process every state transition the same, or the controller may adjust the relaxation voltage over the entire range of high tilt state values. If the high tilt value does not exceed the threshold, the controller immediately applies the high-frequency kick voltage (step 312) to switch the cell to the low state as fast as possible and then applies the low-amplitude low-frequency low state holding voltage (step 314)

If the high tilt value exceeds the threshold, the controller determines the relaxation and kick voltages and their respective relaxation and kick periods for optimum switching speed based, at least in part, on the tilt value of the high tilt state (step 316). The controller suitably determines these voltages by using the high state tilt value to index a LUT in which the voltages and periods are stored. The controller applies the relaxation voltage to the cell for the specified relaxation period (step 318) and then applies the high-frequency kick voltage to the cell for the specified kick period (step 312). If the precise value of the current high state tilt value is not indexed in the LUT, the controller can derive the waveforms from the one or more nearest neighbors using standard interpolation algorithms. Once the cell has switched to the low state, the controller applies the low-amplitude low-frequency low state holding voltage to the cell. In a binary application, the direction of the transitions will switch back-and-forth. Conversely in a gray scale application there may be multiple high-to-low transitions in a row.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for fast switching a dual frequency liquid crystal cell from a high tilt state to a low tilt state, comprising:
providing a liquid crystal cell having opposed substrates with dual frequency liquid crystal material characterized by a cross-over frequency disposed there between, each said substrate associated with at least one electrode that is connected to a power supply that applies different voltage magnitudes at different frequencies above and below the cross-over frequency;

applying a first holding voltage of a first magnitude to the material at a frequency below the cross-over to maintain a high tilt state;

applying a relaxation voltage to the material to allow the liquid crystal molecules to relax towards a low tilt state;

applying a kicking voltage of a second magnitude greater than said first magnitude to the material at a frequency above the cross-over to accelerate a transition into the low tilt state; and applying a second holding voltage of a third magnitude less than said first magnitude to the material at a frequency below the cross-over to maintain said low tilt state, wherein the first holding voltage, the relaxation voltage, the kicking voltage, and the second holding voltage are applied in sequence, and wherein the relaxation voltage is applied only between the first holding voltage and the kicking voltage.

2. The method of claim 1, wherein the liquid crystal molecules in the low tilt state exhibit on average a low tilt angle and on average an original azimuth angle, the application of the relaxation voltage to the material allowing the molecules to relax due to elastic torque to reduce the low tilt angle in the direction of the original azimuth angle.

3. The method of claim 1, wherein when an average tilt angle of the liquid crystal molecules in the high tilt state is less than a threshold, said relaxation voltage is not applied and the kicking voltage is applied immediately to accelerate the transition to into the low tilt state.

4. The method of claim 1, wherein the applied relaxation voltage varies as a function of an average tilt angle of the high tilt state.

5. The method of claim 4, wherein different relaxation voltages are stored in a look-up table indexed by the average tilt angle of the high tilt state.

6. The method of claim 1, wherein the material is switched from the low to the high tilt state by applying another kicking voltage of a fourth magnitude greater than said third magnitude to the material at a frequency below the cross-over to accelerate transition to the high tilt state without application of another intervening relaxation voltage.

7. The method of claim 1, wherein said liquid crystal cell operates in the visible or near-IR bands, said relaxation voltage being applied for between 0.3 and 1 milliseconds.

8. The method of claim 7, wherein the switching period from the high to the low tilt state is no greater than 2 milliseconds.

9. The method of claim 1, wherein said liquid crystal cell operates in the mid-wave IR or long wave IR bands, said relaxation voltage being applied for between approximately 1 and 4 milliseconds.

10. The method of claim 9, wherein the switching period from the high to the low tilt state is no greater than approximately 5 milliseconds.

11. The method of claim 1, wherein application of the relaxation voltage comprises applying a voltage signal of a fourth magnitude less than said first magnitude at a frequency below said cross-over.

12. The method of claim 11, wherein said fourth magnitude is zero volts.

13. The method of claim 1, wherein application of the relaxation voltage comprises applying a windowing function to the kicking voltage so that the amplitude of the kicking voltage starts near zero and increases to the second magnitude.

14. A dual-frequency liquid crystal cell that switches between low and high tilt states, comprising:

a pair of opposed substrates having a cell gap there between;

a dual frequency nematic liquid crystal material disposed in said cell gap, said material characterized by a cross-over frequency;

at least one electrode coupled to each of said substrates;

a power supply connected to said electrode that applies different voltage magnitudes at different frequencies above and below the cross-over frequency; and a controller configured to control the power supply for (a) applying a first holding voltage of a first magnitude to the material at a frequency below the cross-over to maintain a high tilt state, (b) applying a relaxation voltage to the material to allow the liquid crystal molecules to relax towards a low tilt state, (c) applying a kicking voltage of a second magnitude greater than said first magnitude to the material at a frequency above the cross-over to accelerate a transition into the low tilt state, and (d) applying a second holding voltage of a third magnitude less than said first magnitude to the material at a frequency below the cross-over to maintain said low tilt state, wherein the first holding voltage, the relaxation voltage, the kicking voltage, and the second holding voltage are applied in sequence, and wherein the relaxation voltage is applied only between the first holding voltage and the kicking voltage.

15. The dual-frequency liquid crystal cell of claim 14, wherein the liquid crystal molecules in the low tilt state exhibit on average a low tilt angle and on average an original azimuth angle, the controllers application of the relaxation voltage to the material allowing the molecules to relax due to elastic torque to reduce the low tilt angle in the direction of the original azimuth angle.

16. The dual-frequency liquid crystal cell of claim 14, wherein when an average tilt angle of the liquid crystal molecules in the high tilt state is less than a threshold, said controller does not apply the relaxation voltage and applies the kicking voltage immediately to accelerate the transition to into the low tilt state.

17. The dual-frequency liquid crystal cell of claim 14, wherein the controller varies the applied relaxation voltage as a function of an average tilt angle of the high tilt state.

18. The dual-frequency liquid crystal cell of claim 17, wherein different relaxation voltages are stored in a look-up table indexed by an average tilt angle of the high tilt state.

19. The dual-frequency liquid crystal cell of claim 14, wherein the controller switches the material from the low to the high tilt state by applying another kicking voltage of a fourth magnitude greater than said third magnitude to the material at a frequency below the cross-over to accelerate transition to the high tilt state without application of another intervening relaxation voltage.

20. The dual-frequency liquid crystal cell of claim 14, wherein application of the relaxation voltage by the controller comprises applying a voltage signal of a fourth magnitude less than said first magnitude at a frequency below said cross-over.

21. The dual-frequency liquid crystal cell of claim 20, wherein said fourth magnitude is zero volts.

22. The dual-frequency liquid crystal cell of claim 14, wherein application of the relaxation voltage by the controller comprises applying a windowing function to the kicking voltage so that the amplitude of the kicking voltage starts near zero and increases to the second magnitude.

* * * * *